United States Patent [19]

Ambroziak et al.

[11] Patent Number: 5,314,106
[45] Date of Patent: May 24, 1994

[54] METHOD FOR JOINING STEEL TO ALUMINUM ALLOY COMPONENTS OR TITANIUM ALLOY COMPONENTS, AND TURBOCHARGERS OBTAINED BY THE METHOD

[75] Inventors: Andrzej Ambroziak, Wroclaw, Poland; Rudolf Lison, Herzogenrath; Rudolf Ricanek, Weilheim, both of Fed. Rep. of Germany

[73] Assignee: Asea Brown Boveri AG, Baden, Switzerland

[21] Appl. No.: 960,351
[22] PCT Filed: May 14, 1992
[86] PCT No.: PCT/CH92/00094
§ 371 Date: Mar. 16, 1993
§ 102(e) Date: Mar. 16, 1993
[87] PCT Pub. No.: WO92/20487
PCT Pub. Date: Nov. 26, 1992

[30] Foreign Application Priority Data

May 16, 1991 [DE] Fed. Rep. of Germany ....... 4116088

[51] Int. Cl.$^5$ ............................................. B23K 20/12
[52] U.S. Cl. .................. 228/114.5; 228/114; 228/189; 228/262.44
[58] Field of Search ........... 228/112, 113, 114, 263.16, 228/189

[56] References Cited

U.S. PATENT DOCUMENTS

| | | | |
|---|---|---|---|
| 3,121,948 | 2/1964 | Hollander et al. | 228/114 |
| 3,368,272 | 2/1968 | Wacongne et al. | 228/262.44 X |
| 3,421,201 | 1/1969 | Oberle et al. | 228/113 |
| 4,333,671 | 6/1982 | Holko | 228/112 X |
| 4,514,470 | 4/1985 | Rosenthal et al. | 228/262.44 X |
| 4,765,530 | 8/1988 | Dang et al. | 228/262.44 X |
| 5,064,112 | 11/1991 | Isobe et al. | 228/112 |

FOREIGN PATENT DOCUMENTS

| | | | |
|---|---|---|---|
| 157403 | 6/1990 | Japan | 228/112 |
| 1462772 | 1/1977 | United Kingdom | 228/112 |

OTHER PUBLICATIONS

Sassani et al. *Welding Journal* (supplement) American Welding Society Issue of Nov. 1988 pp. 264s–270s.

*Primary Examiner*—Kenneth J. Ramsey
*Attorney, Agent, or Firm*—Oblon, Spivak, McClelland, Maier & Neustadt

[57] ABSTRACT

Blanks or structural components of steel are joined to those of an aluminum alloy (a) or titanium alloy (b) by friction-welding with insertion of at least one transition layer of a ductile subgroup metal, in particular by applying, according to (a), a pure nickel layer to the steel by friction-welding and joining the surface of the nickel layer, after weld bead removal, to the aluminum alloy by friction-welding. According to (b), a copper layer is applied to the steel by friction-welding and a vanadium layer is applied to the titanium alloy by friction-welding. The copper and vanadium surfaces are, after weld bead removal, then joined to one another by friction-welding. In the case of steel which tends to form martensitic zones, a layer of austenitic steel is applied by friction-welding before the application of the copper layer. The process is especially suitable for joining the turbine wheel and shaft or fixing component for the shaft of a turbocharger.

2 Claims, 6 Drawing Sheets

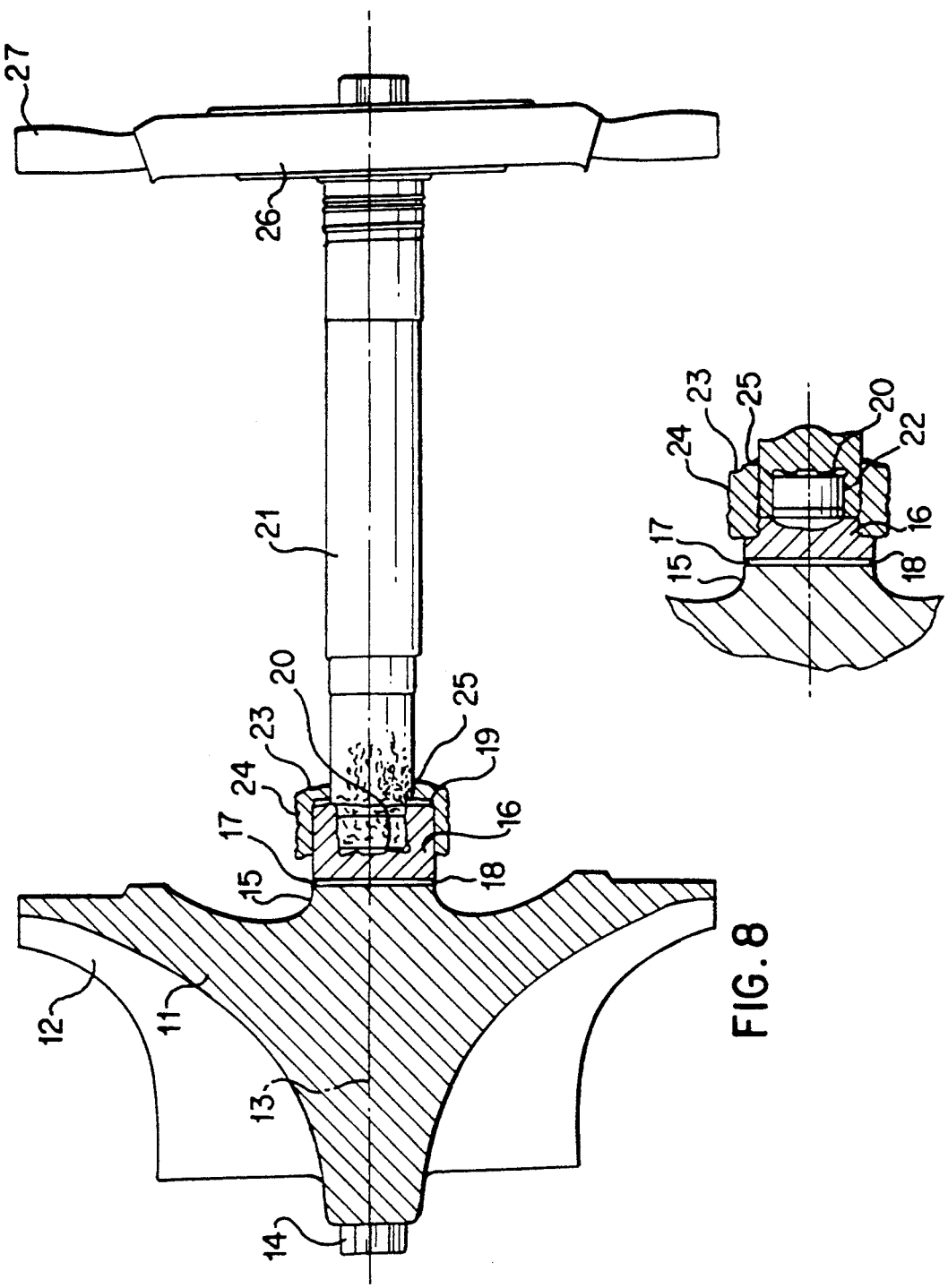

METHOD FOR JOINING STEEL TO ALUMINUM ALLOY COMPONENTS OR TITANIUM ALLOY COMPONENTS, AND TURBOCHARGERS OBTAINED BY THE METHOD

BACKGROUND OF THE INVENTION

1. Field of the Invention

The invention relates to a method for joining blanks or structural components of steel to those of aluminum alloy or titanium alloy, and it comprises turbochargers obtained by the method.

2. Discussion of Background

The joining of different materials plays a considerable part in the highly developed fabrication technology, since frequently different properties are demanded within one arrangement, which properties cannot be obtained by a single material so that, depending on the manufacture and operating function, different materials are used for individual elements of a component or of a structure, in order to arrive at an optimum of economical manufacture and mechanical property.

Thus, for example, according to European Patent Specification 0,129,311, aluminum or aluminum alloy is used, for reasons of manufacturing technology, for the compressor rotor of a turbocharger and, because of the good mechanical properties such as strength and toughness, tool steel is provided for the shaft to be fitted on or for the fixing component for the latter, and these are to be joined to one another by friction-welding.

Some difficulties arise, however, in following this recommendation since, although aluminum can be joined to steel by friction-welding under certain conditions, making a welded joint between steel and hardenable aluminum alloys causes great difficulties.

Likewise, friction-welded joints, capable of being loaded, between steel and titanium alloys have hitherto not been achieved.

SUMMARY OF THE INVENTION

Accordingly, one object of the invention is to develop a novel method, by means of which blanks or structural components of steel can be joined to those of aluminum alloys or titanium alloys by friction-welding.

The method according to the invention, developed for this purpose, comprises joining the blanks or components to one another with insertion of at least one transition layer of a ductile subgroup metal by friction weld-joining of the individual contact surfaces.

Owing to the use of ductile pure metal layers, thermal strains between the partners of the joint can be compensated. The material systems on the joint surfaces remain clear, and especially the formation of brittle phases in the boundary region is suppressed. Of course, attention is paid, here to the metallurgical compatibility of the partners of the joint and to the suitability for friction-welding.

The joining of steel to a titanium alloy is carried out especially by applying a copper layer to the steel by friction-welding and applying a vanadium layer to the titanium alloy by friction-welding and then joining the copper and vanadium surfaces, after weld bead removal, to one another by friction-welding.

The friction welds are advantageously made with exclusion of the ambient air under an inert gas, in vacuo or especially under a liquid such as, for example, a petroleum/mineral oil mixture, such as is used for spark-erosion machining.

For the joining, conventional friction-welding machines can be used which run at fixed speeds of rotation or with infinite adjustment of the speed of rotation. Friction for a certain time or to a certain depth are possible modes of operation.

In the method according to the invention, conventional speeds of rotation in the region of 500–2000 rpm, especially in the range around 1000 rpm, and forging pressures up to about 500 kN, especially in the range 100–200 kN, can be applied.

The interlayers in the finished joint are as thin as possible; their thickness is advantageously within the mm range.

Before the friction-welding, the surface is carefully prepared; especially, the freshly turned surface is degreased in an ultrasonic bath, rinsed with alcohol and dried.

In order to avoid high starting torques, a conical joining surface can be provided on one joining partner but, for reasons of the loading capacity of the joint, flat joining surfaces are preferred.

Roughnesses of the surfaces to be joined of 30–300 $\mu$m, especially about 100 $\mu$m, are appropriate.

Special features of the invention can be taken from the subclaims and from the following description by reference to examples.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 8 and 9 show a compressor rotor with turbine wheel and shaft of a turbocharger in two alternatives for the fixing component for the shaft.

DESCRIPTION OF THE PREFERRED EMBODIMENTS

Example 1

Joining of Quenched and Tempered Steel St575 With Hardenable Aluminum Alloy AN40.

A nickel platelet ($2 \times 50 \times 50$) was applied by friction-welding to the end face, prepared as indicated above, of a cylindrical steel bar ($\phi 45 \times 140$). After weld bead removal from the end f ace of the welded-on nickel layer on the lathe, a cylindrical rod of the aluminum alloy AN40 ($\phi 50 \times 150$) was fitted on in a second friction-welding pass, and the St575/Ni/AN40 joint was completed in this way. The strength reached was 211 N/mm$^2$. The strength of the joint is affected by the surface roughness of the nickel layer. The highest strength values were reached with roughness values of Ni bonding surface (to the AN40) of $R_Z = 162$ $\mu$m, $R_A = 43$ $\mu$m and $R_t = 185$ $\mu$m. The highest strength is here observed on a joint with AN40 in the hardened state.

Figure 1:
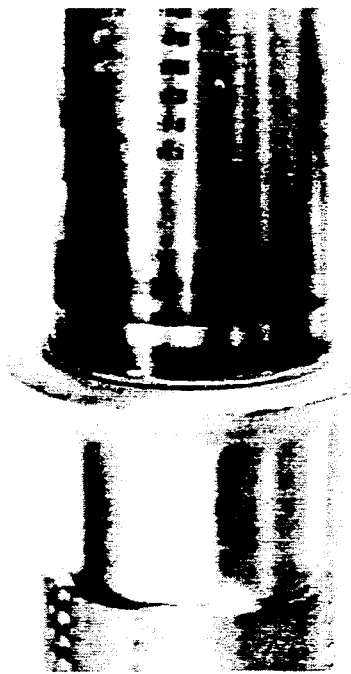
FIGS. 1 to 5 show the result of friction-welded joints according to Example 1.
Figure 2:
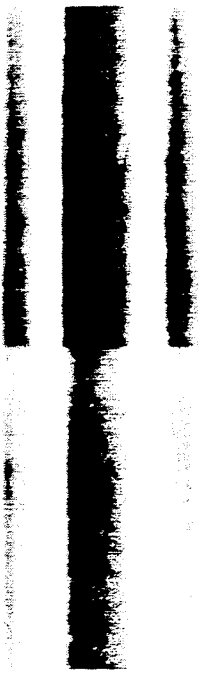
Figure 3:
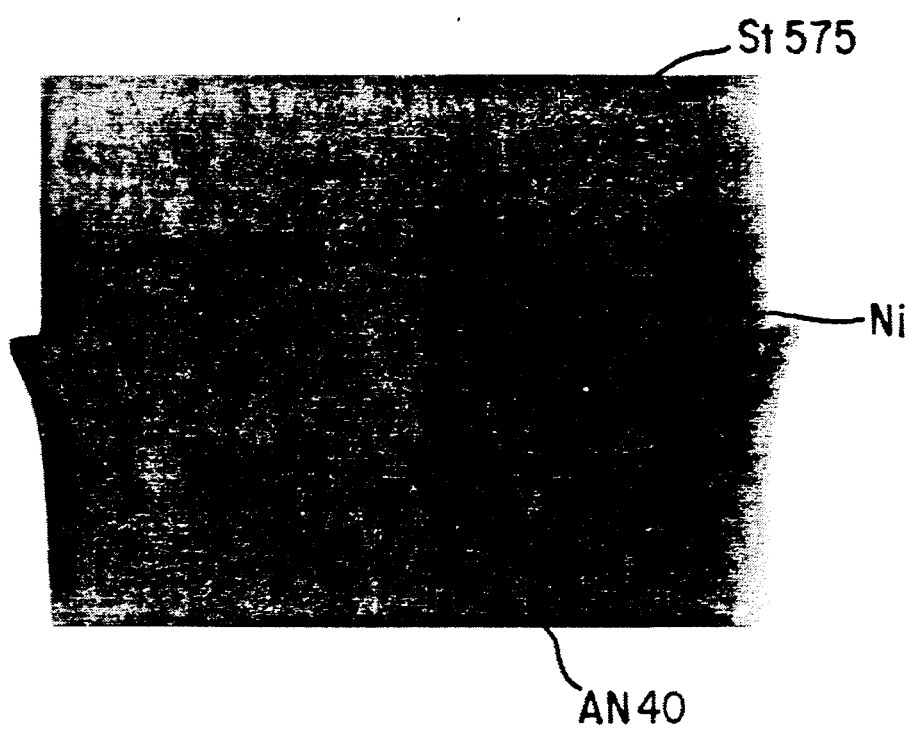
Figure 4:
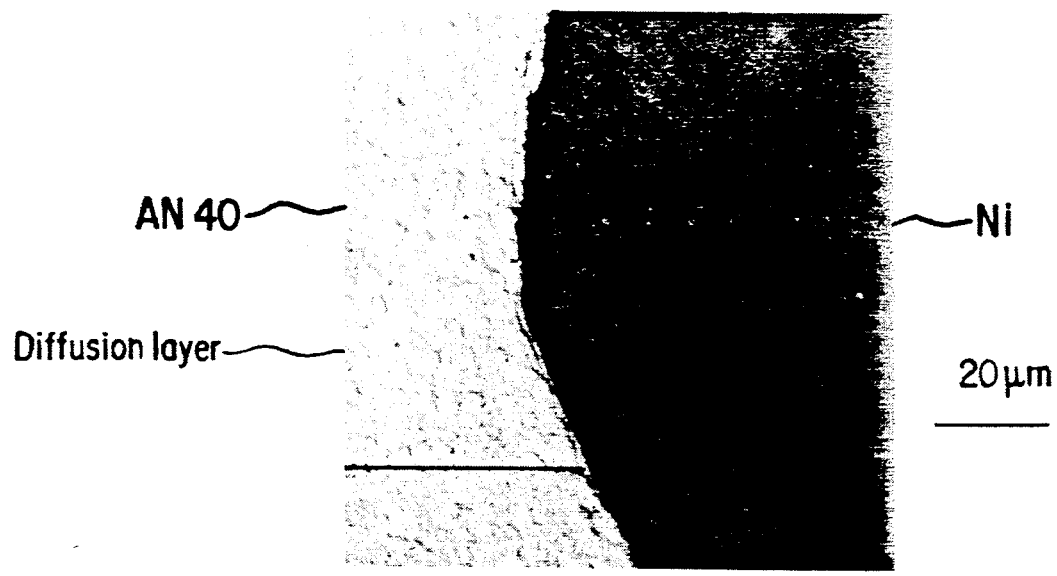
Figure 5:

The attached figures show the friction-welded blank (FIG. 1) after weld bead removal (FIG. 2), and the cross-section through the blank (FIG. 3). FIGS. 4 and 5 show the microstructure of the transitions in this joint.

In order to avoid embrittlements in the bonding plane, the St575/Ni joint was heat-treated for 60 minutes in a high vacuum at 680° C.

In a manner analogous to that described above, blanks of other hardenable aluminum alloys such as AlCuMg1, AlCuMg2 or AlCuMg1828 can be joined to steel by friction-welding with an Ni interlayer.

Example 2

Joining of Quenched and Tempered Steel St575 to Titanium Alloy Ti6Al4V.

On the one hand, a vanadium platelet was applied by friction-welding to a round bar of the titanium alloy ($\phi 45 \times 150$) and, on the other hand, a copper layer was applied by friction-welding to a round St575 bar ($\phi 45 \times 140$), and the weld beads were carefully removed on the lathe. A vanadium layer of 3.5–4.5 mm thickness remained on the titanium, and a copper layer of 5–8.5 mm thickness remained on the St575. The further welding of vanadium to copper led to a shortening at the expense of the copper. In the finished joint, the copper layer had a thickness of less than 1 mm.

Particularly good load-bearing capacities of the Ti-6Al4V/V/Cu/St575 joint up to the range of 660 N/mm$^2$ is obtained by high forging pressures in the range of 150 N/mm$^2$ during the friction-welding.

In order to avoid increases in the hardness of the St575, an interlayer of austenitic X10CrNiTi189 steel was incorporated between the copper and St575 in further tests. This additional interlayer does not undergo any structural changes during friction-welding, but it prevents heating of the St575 into the austenite region and the associated hardness increase during cooling. The X10CrNiTi189 layer was friction-welded to the St575 and this joint was then heat-treated for one hour at 600° C. in order to eliminate the hardness increase in the St575. After removal of weld beads of the austenitic layer on the lathe to a 2.5 mm thickness, it could be further friction-welded to copper. With such a joint, strengths of 454 N/mm$^2$ were reached.

Figure 6:
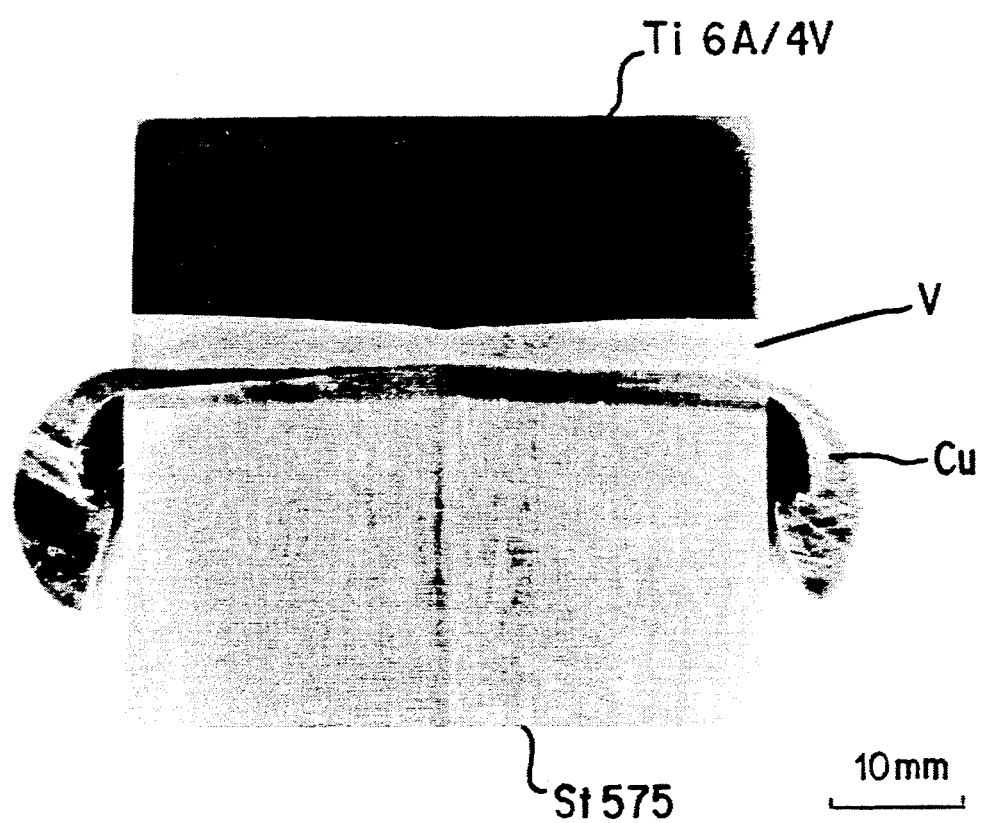
FIGS. 6 and 7 show macrophotographs of the joints according to Example 2.
Figure 7:
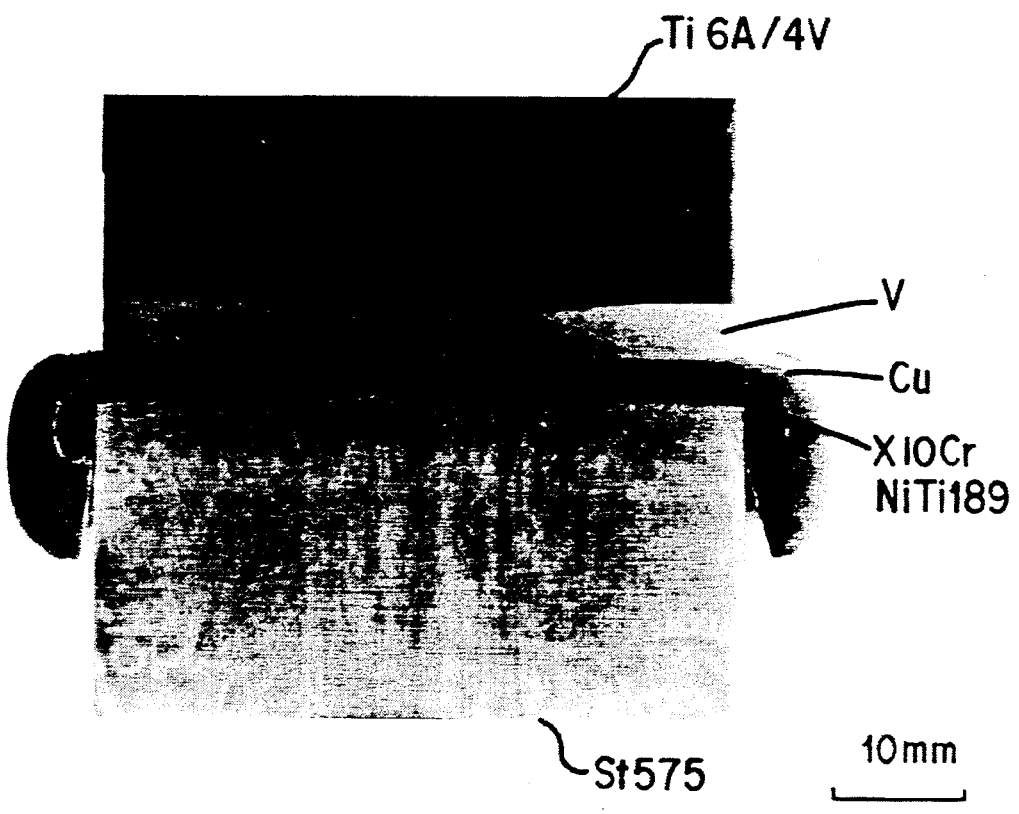

FIGS. 6 and 7 show macrophotographs of the joints.

With the same arrangement of interlayers and the same processing steps, material joints of steel to $\alpha$- and ($\alpha+\beta$)-titanium alloys such as, for example, TiCu2 or TiAl5Fe2.5, can be made.

Steels of low carbon content, which do not tend to form martensite in the course of cooling after friction-welding, can be directly friction-welded to copper, omitting an interlayer of the X10CrNiTi189 steel.

Example 3

The method indicated above in Example 1 was used for joining a fixing component for the shaft of a turbocharger to the compressor rotor:

The component thus produced is illustrated on the attached FIG. 8: the fixing component 16 provided with a thread is friction-welded-via interlayers 18 to the axial end face 17 of the hub 11 joined to blades 12. The shaft 21 integral with the turbine disk 26 with integral or attached blades 27 is screwed to the fixing component 16, and a cylindrical or stepped ring 23, which is shrunk on or slipped on and receives the radial sealing rings 24 and is axially formed as a sliding surface 25, grips over the shaft 21.

Instead of the fixing component 16, the shaft 21 itself can also be friction-welded to the hub 11. The same applies to the connection of the turbine wheel 26 to the shaft 21.

Alternatively, the compressor rotor 11-17 can also consist of a wrought titanium alloy instead of the wrought aluminum alloy and is then joined according to Example 2 by friction-welding to the fixing component 16 or to the shaft 21.

Obviously, numerous modifications and variations of the present invention are possible in the light of the above teachings. It is therefore to be understood that, within the scope of the appended claims, the invention may be practiced otherwise than as specifically described herein.

What is claimed as new and desired to be secured by letters patent of the United States is:

1. A method for joining components of steel to those of a titanium alloy, comprising applying a copper layer to the steel by friction-welding and applying a vanadium layer to the titanium alloy by friction-welding, removing a weld bead formed and joining the copper and vanadium surfaces to one another by friction-welding.

2. The method as claimed in claim 1, comprising applying a layer of austenitic steel by friction-welding to said steel, which tends to form martensitic zones, before applying the copper layer.

* * * * *